(12) United States Patent
Wingender et al.

(10) Patent No.: US 11,801,820 B2
(45) Date of Patent: Oct. 31, 2023

(54) ELECTRICALLY ACTUATABLE OPERATING UNIT FOR A MOTOR VEHICLE BRAKE, BRAKE BOOSTER HAVING SUCH AN ELECTRICALLY ACTUATABLE OPERATING UNIT, AND MOTOR VEHICLE BRAKE SYSTEM HAVING SUCH A BRAKE BOOSTER

(71) Applicant: ZF Active Safety GmbH, Koblenz (DE)

(72) Inventors: Kurt Wingender, Hartenfels (DE);
Martin Hofmann, Mendig (DE); José Manuel Calvo Martinez, Kruft (DE);
Martin Sakalla, Andernach (DE); Iosu Oloriz del Rosario, Huarte (ES);
Jennifer Klein, Neiderkassel (DE)

(73) Assignee: ZF Active Safety GmbH, Koblenz (DE)

( * ) Notice: Subject to any disclaimer, the term of this patent is extended or adjusted under 35 U.S.C. 154(b) by 310 days.

(21) Appl. No.: 17/218,341

(22) Filed: Mar. 31, 2021

(65) Prior Publication Data
US 2021/0309200 A1   Oct. 7, 2021

(30) Foreign Application Priority Data

Apr. 3, 2020   (DE) .......................... 102020109452.3

(51) Int. Cl.
*B60T 13/74* (2006.01)
*B60T 13/14* (2006.01)
*B60T 11/18* (2006.01)

(52) U.S. Cl.
CPC ............. *B60T 13/745* (2013.01); *B60T 11/18* (2013.01); *B60T 13/145* (2013.01)

(58) Field of Classification Search
CPC ...... B60T 13/745; B60T 13/145; B60T 11/18; F15B 7/08
See application file for complete search history.

(56) References Cited

U.S. PATENT DOCUMENTS 10,040,434 B2   8/2018   Gerdes et al.
11,186,263 B2   11/2021   Klein et al.
(Continued)

FOREIGN PATENT DOCUMENTS

| DE | 102014211551 A1 | 12/2015 |
| DE | 102017222138 A1 | 6/2019 |
| DE | 102018006237 A1 | 2/2020 |

*Primary Examiner* — Bradley T King
(74) *Attorney, Agent, or Firm* — Robert James Harwood

(57) ABSTRACT

An electrically actuatable operating unit (106) for a motor vehicle brake comprises a housing body (122) which is arranged so as to be displaceable in a braking direction for operation of the motor vehicle brake, a recess (150) formed in the housing body (122), wherein the recess (150) is delimited at one longitudinal end by a contact shoulder (172), a through-opening (158) delimited by the contact shoulder (172), an operating member (124) which is arranged in the recess (150) so as to be displaceable for operation of the motor vehicle brake and projects through the through-opening (158) of the contact shoulder (172), wherein the operating member (124) can be arranged in a force-transmitting manner between a brake pedal and the motor vehicle brake (400). The operating unit (106) further comprises a return spring (126) which is arranged in the recess (150) and is configured to move the operating member (124) relative to the housing body (122) away from the contact shoulder (172), and a sleeve element (180) which circumferentially surrounds a portion of the operating member (124) at least partially and is held in contact with the contact shoulder (172) by the return spring (126), and wherein the sleeve element (180) projects into the through-
(Continued)

opening (158) in such a manner that it is arranged between the operating member (124) and an inner circumferential surface of the contact shoulder (172) that delimits the through-opening (158).

16 Claims, 2 Drawing Sheets

(56) References Cited

U.S. PATENT DOCUMENTS

| | | | | |
|---|---|---|---|---|
| 2004/0046445 A1* | 3/2004 | Verbo | ................... | B60T 8/3275 303/114.3 |
| 2007/0056438 A1* | 3/2007 | Attard | ................... | B60T 13/573 91/376 R |
| 2010/0192763 A1* | 8/2010 | Becker | ................... | B60T 13/72 91/369.1 |
| 2011/0247324 A1* | 10/2011 | Schluter | ................. | B60T 13/57 29/428 |
| 2012/0200147 A1* | 8/2012 | Endo | ........................ | B60T 8/38 303/3 |
| 2013/0192456 A1* | 8/2013 | Jakobi | ..................... | B60T 13/72 92/96 |
| 2015/0001915 A1* | 1/2015 | Murayama | ............ | B60T 13/662 303/3 |
| 2015/0001917 A1* | 1/2015 | Murayama | .............. | B60T 11/18 303/14 |
| 2015/0135945 A1* | 5/2015 | Yatabe | ..................... | F16J 3/042 92/187 |
| 2015/0360666 A1* | 12/2015 | Gerdes | .................... | B60T 11/18 60/545 |
| 2017/0253225 A1* | 9/2017 | Lopez | ..................... | B60T 13/57 |
| 2018/0345932 A1* | 12/2018 | Gaffe | ...................... | B60T 11/18 |
| 2020/0017091 A1* | 1/2020 | Bischoff | ................ | B60T 11/18 |
| 2020/0023828 A1* | 1/2020 | Fukayama | ............ | B60T 13/686 |
| 2020/0047733 A1* | 2/2020 | Klein | ...................... | B60T 11/18 |
| 2020/0180581 A1* | 6/2020 | Shigeta | .................. | B60T 13/74 |
| 2020/0276964 A1* | 9/2020 | Goto | ....................... | B60T 13/04 |
| 2020/0384972 A1 | 12/2020 | Calvo Martinez et al. | | |
| 2021/0009099 A1* | 1/2021 | Reuter | .................... | B60T 7/042 |
| 2021/0101569 A1* | 4/2021 | Lemke | ..................... | F16B 1/00 |
| 2021/0245724 A1* | 8/2021 | Nagel | ................... | B60T 13/746 |
| 2021/0309190 A1* | 10/2021 | Struschka | ............. | B60T 11/18 |
| 2022/0169220 A1* | 6/2022 | Kim | ...................... | B60T 11/165 |

* cited by examiner

ELECTRICALLY ACTUATABLE OPERATING UNIT FOR A MOTOR VEHICLE BRAKE, BRAKE BOOSTER HAVING SUCH AN ELECTRICALLY ACTUATABLE OPERATING UNIT, AND MOTOR VEHICLE BRAKE SYSTEM HAVING SUCH A BRAKE BOOSTER

RELATED APPLICATIONS

The present invention claims priority from 102020109452.3, filed 3 Apr. 2020, the entirety of which is incorporated herein by reference.

TECHNICAL FIELD

The present disclosure relates generally to electrically actuatable operating units for motor vehicle brakes. Concretely, aspects associated with undesirably occurring vibrations during operation of such an operating unit are described.

BACKGROUND

Known electrically actuatable operating units for motor vehicle brake systems are provided, for example, to electromechanically boost an operating force built up by the driver via the brake pedal, so that the effort is reduced for the driver. This frequently takes place by means of an electrically actuatable actuator which, when actuated, effects an adjusting movement of one or more components with which a brake pressure is increased or generated in a master brake cylinder. Known electrically actuatable operating units can also build up the necessary brake pressure on their own, independently of an operation of the brake pedal, for example in an autonomous driving mode, by actuation of the actuator.

In motor vehicle brake systems having such electrically actuatable operating units, the brake pedal is often mechanically coupled or at least capable of being mechanically coupled with the components that are moved by means of the actuator. As a result, during a braking operation, for example in autonomous driving mode, the brake pedal can concomitantly be moved in the direction towards the vehicle floor. If there is an obstruction (such as, for example, an object or a foot of the driver) in the adjustment path of the brake pedal, that is to say between the brake pedal and the vehicle floor, the components that connect the brake pedal to the electrically actuatable actuator are increasingly under tension. This can result in damage to the components that connect the brake pedal to the moved components, but also in injury to the trapped foot.

In order to prevent this, a dynamically acting foot protection system (dDFP, dynamic driver foot protection) and/or component protection system (CPF, component protection function) is often provided. This component/foot protection system is intended to detect that there is a foot beneath the brake pedal during autonomous and/or semi-autonomous braking and switch the pressure build-up to an ESC (electronic stability control) unit in order to protect the foot and the components.

During operation of such systems, vibrations of the system often occur, which make the detection of a trapped obstruction more difficult. The degree of deformation of a resilient element arranged in the operating unit can thus be a measure of whether such a case of a trapped obstruction is present. However, the vibrations that occur can also lead to deformation of the resilient element. As a result, reliable detection of an obstruction beneath the brake pedal is made more difficult.

SUMMARY

The object underlying the present disclosure is to provide an electrically actuatable operating unit for a motor vehicle brake, which permits safe operation. In some embodiments, it is to be possible in particular to reliably detect an obstruction trapped beneath the brake pedal.

According to a first aspect there is provided an electrically actuatable operating unit for a motor vehicle brake, which operating unit has a housing body which is arranged so as to be displaceable in a braking direction for operation of the motor vehicle brake, a recess formed in the housing body, wherein the recess is delimited at one longitudinal end by a contact shoulder, a through-opening delimited by the contact shoulder, an operating member which is arranged in the recess so as to be displaceable for operation of the motor vehicle brake and projects through the through-opening of the contact shoulder, wherein the operating member can be arranged in a force-transmitting manner between a brake pedal and a motor vehicle brake, a return spring which is arranged in the recess and is configured to move the operating member relative to the housing body away from the contact shoulder, and a sleeve element which circumferentially surrounds a portion of the operating member at least partially and is held in contact with the contact shoulder by the return spring. The sleeve element projects into the through-opening in such a manner that it is arranged between the operating member and an inner circumferential surface of the contact shoulder that delimits the through-opening.

The electrically actuatable operating unit can act directly or indirectly, for example via a transmission. The transmission can functionally be provided between an electrically actuatable electric motor of the operating unit and the displaceable housing body.

The contact shoulder delimiting the recess can be formed by the housing body. In particular, the contact shoulder can be formed in one piece with the housing body. However, the contact shoulder can also be formed by a separate component which is fixedly connected to the housing body. The through-opening delimited by the contact shoulder can have any conceivable cross-sectional shape (outline shape). In particular, the cross-sectional shape can be adapted to the cross-sectional shape of the operating member. In the case of a cylindrical operating member with a circular cross-section, the cross-sectional shape of the through-opening can, for example, also be circular.

In some embodiments, the operating member is received only partially in the recess of the housing body and projects through the through-opening of the contact shoulder. In particular, the operating member can be received in the housing body in such a manner that it is displaceable relative to the housing body, in the braking direction and in a direction contrary to the braking direction. The operating member can in particular be displaced in the braking direction by operation of the brake pedal and displaced back into a rest position again by means of the restoring force of a return spring and/or of a master brake cylinder. On displacement in the braking direction, the operating member can act directly or indirectly on a pressure piston of a master brake cylinder of a motor vehicle brake system for providing a brake pressure. The transmission of force can take place mechanically and/or hydraulically. The brake pedal can be coupled with the operating member via one or more force input members. In particular, the operating member can be fixedly coupled with the brake pedal in the vehicle, so that it is always coupled with the brake pedal. The operating member can be in the form of an operating rod with a substantially circular cross-section.

The operating member can further be coupled with the housing body, so that a displacement of the housing body can also lead to a displacement of the operating member. The operating member can be coupled with the housing body in particular via further components of the operating unit.

The housing body can be part of a housing of the operating unit or of an actuator. In the case of electrical actuation of the operating unit, the housing body is displaced in the braking direction for operation of the vehicle brake. The housing body can also be coupled directly or indirectly with a pressure piston of the master brake cylinder, so that a displacement of the housing body leads to a displacement of the pressure piston and thus to the build-up of a brake pressure. The housing body can further be coupled with the operating member, so that a displacement of the housing body also leads to a displacement of the operating member.

The sleeve element is arranged around the circumferential surface of a portion of the operating member. The sleeve element can thereby surround the operating member completely, that is to say be continuous, or only partially, that is to say have one or more portions in the circumferential direction which surround the operating member. The sleeve element can have a through-opening through which the operating member is guided. In some variants, the sleeve element, the contact shoulder and the return spring arranged in the recess are arranged in such a manner that the sleeve element is held in contact with the contact shoulder by the return spring. In particular, the sleeve element can be held in contact with an inner contact surface of the contact shoulder that faces the recess. The sleeve element can be arranged at least partially inside the recess. The sleeve element or parts thereof can be arranged between the contact shoulder and the return spring. The sleeve element further projects into the through-opening, so that it is arranged in that region between the inner circumferential surface of the contact shoulder and the operating member. The sleeve element can thus support or stabilize the return spring and/or the operating member relative to the housing body, so that a movement of those components relative to one another is limited or prevented. The sleeve element can be in one-part or multi-part form.

The operating member can be arranged so as to be displaceable relative to the sleeve element. In particular, in the case of a movement of the operating member relative to the housing body in the braking direction or in the direction contrary to the braking direction, the sleeve element can remain fixedly anchored in the housing body.

In one embodiment, the sleeve element can lie or be guided with an inner circumferential surface on an outer circumferential surface of the operating member. Very generally, regardless of the form of the sleeve element and of the operating member, the sleeve element can lie or be guided with the surface surrounding the operating member on the outer surface of the operating member. The sleeve element thereby preferably lies loosely on the operating member in order that the operating member is movable, in particular displaceable, relative to the sleeve element. The sleeve element can lie with frictional engagement on the operating member so that, when the two components move relative to one another, a frictional force occurs between the two components. In an alternative embodiment, the sleeve element surrounds the operating member at a (small) distance so that, when the two components move relative to one another, they are not in contact.

In a further embodiment, the sleeve element can lie or be guided with an outer circumferential surface on the inner circumferential surface of the contact shoulder that delimits the through-opening. The sleeve element can lie in such a manner that it is fixedly anchored relative to the housing body. The sleeve element can support the housing body relative to the operating member.

Likewise, in a variant of the further embodiment, the sleeve element can lie or be guided with an outer circumferential surface on an inside wall of the housing body that delimits the recess. In this variant, the sleeve element can lie in such a manner that it is fixedly anchored relative to the housing body. The sleeve element can support the housing body relative to the operating member.

In an alternative embodiment to the further embodiment, the sleeve element can be arranged at a distance, in particular at a small distance, from the housing body.

In one embodiment, the sleeve element can have a first portion which is arranged in the inside of the recess and a second portion which projects into the through-opening. The first and the second portion can be in one piece, alternatively the first and the second portion can be in multi-part form. The first portion can be held in contact with the contact shoulder by the return spring. In particular, the first portion of the sleeve element can be held in contact with an inner contact surface of the contact shoulder that faces the recess. The second portion can adjoin the first portion directly.

In a variant of the embodiment, the first portion can have a larger outside dimension than the second portion. If the sleeve element is cylindrical, the first portion can have a larger outside diameter than the second portion. At the transition from the first portion to the second portion there can be formed a step with which the sleeve element lies on the inner surface of the contact shoulder that faces the recess.

According to a further embodiment, the sleeve element can be arranged in the housing body with one end outside the recess. In this further embodiment, the sleeve element, or the second portion of the sleeve element, can project through the through-opening. The second portion can project through the entire through-opening and into a cavity of the housing body that adjoins the recess.

In one embodiment, the coupling of the housing body with the operating member can take place by means of a stop element which is connected to the operating member. The housing body can be so configured that, in the case of a movement—for example on autonomous or semi-autonomous braking—it cooperates with the stop element, on reaching a specific position, in such a manner that the operating member is moved concomitantly. The stop element can be connected at one end to the operating member and at another, opposite end can be guided out of the housing body and connected to the mechanical part of a displacement sensor. As a result, the distance travelled by the operating member and thus by the brake pedal can be determined.

In another variant, a resilient intermediate element can be provided. This intermediate element can be provided to limit a pulling force which acts on the operating member during operation of the motor vehicle brake by electrical actuation of the operating unit.

The resilient intermediate element can be provided to reduce a pulling or drag force which acts on the operating member during in particular autonomous operation of the vehicle brake. The reduced pulling or drag force can be a force contrary to the braking direction, in particular a retaining force. In one implementation, the resilient intermediate element provides for a gradual increase in the pulling or drag force, wherein the rate of increase thereof is defined according to the resilient properties of the intermediate element. The pulling or drag force acting on the operating member can be reduced over a defined operating path until the resilient deformability of the intermediate element is exhausted. The resilient intermediate element can be formed of a resilient material such as, for example, of an elastomer or of a rubber. The resilient element can be formed by a spring steel sheet (e.g. in the form of a leaf spring) or a helical spring. The resilient intermediate element can also act as a spring element.

In the variant with the resilient intermediate element, an end of the sleeve element that is arranged outside the recess can form a stop for the resilient intermediate element. The stop can come to bear when the resilient intermediate element is resiliently deformed as a result of a force contrary to the braking direction. The stop can be positioned in such a manner that it cooperates with the resilient intermediate element when the resilient deformability of the intermediate element is exhausted (and there is then a risk, for example, of damage). When the resilient intermediate element is a leaf spring fastened to the housing body or to the operating member, the stop can be positioned in such a manner that it cooperates with a central region of the leaf spring.

The resilient intermediate element can, for example, be part of an arrangement of one or more components which connects the operating member to the housing body. The operating member can thus be capable of being coupled with the housing body by means of the resilient intermediate element. The operating member can be so configured that, during a movement of the housing body in the case of autonomous or semi-autonomous braking, it is moved concomitantly by cooperation with the resilient intermediate element once a specific position of the housing body has been reached. The resilient intermediate element, from the specific position onwards, can thus come into contact with the stop element and thus be moved concomitantly.

According to a further aspect there is provided an electromechanical brake booster which has an electrically actuatable operating unit as described above.

According to yet a further aspect there is provided a motor vehicle brake system which has the described brake booster.

BRIEF DESCRIPTION OF THE FIGURES

Further aspects, details and advantages of the present disclosure will become apparent from the following description of exemplary embodiments with reference to the figures, in which.

DETAILED DESCRIPTION

Figure 1:
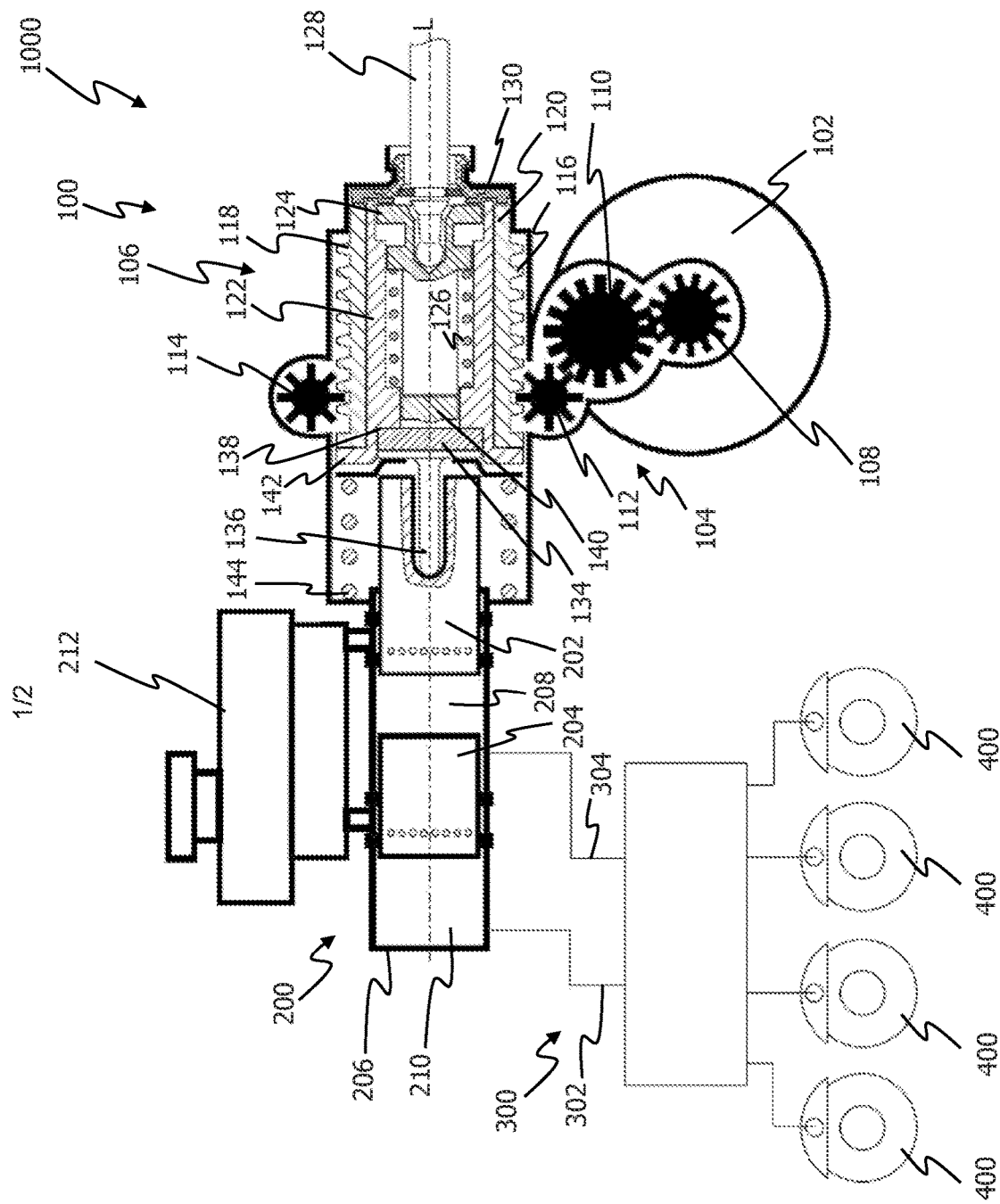
FIG. 1 shows, schematically, a motor vehicle brake system having a brake booster which has an electrically actuatable operating unit.

FIG. 1 shows a motor vehicle brake system 1000 having an electrically actuatable operating unit. The electrically actuatable operating unit is here shown as part of a brake booster. In the following, the structure and functioning of the motor vehicle brake system 1000 according to FIG. 1, which could thus also be used in exemplary embodiments, will first be described.

The motor vehicle brake system 1000 according to FIG. 1 comprises a brake booster 100, a brake cylinder 200, two brake circuits 300, and four wheel brakes 400 connected to the brake circuits 300. The brake cylinder 200 in the exemplary embodiment is a master brake cylinder of the motor vehicle brake system 1000.

The brake booster 100 comprises an electrically actuatable electric motor 102, a transmission 104, and an operating unit 106. The brake booster 100 further has a housing 130 in which at least the operating unit 106 is received. The electric motor 102 operates an output gear 108 in the form of a sprocket, which is coupled via an intermediate gear 110 and optionally further spur gears or transmission components, not shown, with two output-end spur gears 112 and 114. The spur gears 112 and 114 are coupled with the operating unit 106 of the brake booster 100. The operating unit 106 comprises an operating element 120 and a housing body 122 as a force transmission element. The spur gears 112 and 114 are in engagement with rack portions 116 and 118 of the operating element 120 of the operating unit 106.

The housing body 122 has a recess (identified by reference numeral 150 in FIG. 2) in which an operating member 124 of the operating unit 106 is received so as to be displaceable in the direction of a longitudinal axis L. The operating member 124 is supported via a helical spring 126 on a contact shoulder of the housing body 122.

The operating member 124 is coupled in an articulated manner with a force input member 128. When the brake booster 100 is in a state in which it is mounted on the vehicle (not shown), the force input member 128 projects into the passenger compartment. In the passenger compartment of the vehicle, the force input member 128 is coupled with a brake pedal arrangement. The force input member 128 transmits the operating force exerted by the driver on a brake pedal to the operating unit 106 of the brake booster 100. Concretely, the force input member 128 transmits the operating force of the driver to the operating member 124 of the operating unit 106 which, with compression of the spring 126, is displaced to the left in FIG. 1, in order to be able to transmit the operating force exerted by the driver to the master brake cylinder 200.

The operating unit 106 further has a rubber-elastic reaction disk 134 on which a force application element 136 lies loosely. The reaction disk 134 is received in the housing body 122 and lies on an annular surface 138 of the housing body 122 which extends perpendicularly to the longitudinal axis L and forms a contact surface facing the master brake cylinder 200. Via this contact surface 138, the housing body 122 is able to apply a boost force in the braking direction to the reaction disk 134, which transmits this boost force to the force application element 136. The operating member 124 has an end element 140 which, like the contact surface 138, is configured to act on the reaction disk 134 and transmit the operating force applied to the brake pedal by the driver.

The force application element 136 is in the form of a plunger and has a pin-shaped portion. This pin-shaped portion is partially received in a force-transmitting manner in a first pressure piston 202 of the master brake cylinder 200. In addition to the first pressure piston 202, the master brake cylinder 200 has a further pressure piston 204. The two pressure pistons 202 and 204 define in a housing 206 of the master brake cylinder 200 pressure chambers 208 and 210 filled with hydraulic fluid. The pressure chambers 208 and 210 in the master brake cylinder 200 are each connected to a brake circuit 302 and 304. Via the brake circuits 302 and 304, in each case two wheel brakes 400 can be subjected to hydraulic brake pressure for carrying out a braking operation. The master brake cylinder 200 is supplied with brake fluid via an unpressurized container 212.

Operation of the brake booster 100 and thus of the assembly group comprising the brake booster 100 and the brake cylinder 200 can take place by the driver of the vehicle. The driver of the vehicle thereby operates the brake pedal (not shown) and the operating force exerted on the brake pedal by the driver is applied to the operating unit 106 by the force input member 128. As a result of the operation of the brake pedal, the force input member 128 and the operating member 124 rigidly coupled with the force input member 128 are moved to the left, with compression of the spring 126, whereby the end element 140 of the operating member 124 penetrates the rubber-elastic reaction disk 134.

On the basis of the operating force exerted on the brake pedal by the driver and/or the pedal travel of the brake pedal, the boost force to be generated by the electric motor 102 and the transmission 104 can be determined, for example by means of a displacement sensor which is coupled with the brake pedal or the force input member 128, or by measuring the brake pressure generated in the master cylinder 200 by the driver, which is detected by sensors and optionally made plausible.

Alternatively, the deceleration request, and thus the force applied by means of the operating unit 106 to the master brake cylinder 200, can also be initiated by a system for autonomous or semi-autonomous driving. There is then no "brake boosting" in the conventional sense, since no operating force is exerted by the driver.

The boosting force (in the case of normal operation of the brake pedal) or the total operating force (in autonomous or semi-autonomous driving mode) is generated, or converted, by the electric motor 102 and the transmission 104 and transmitted to the operating element 120 of the operating unit 106. The rack portions 116 and 118 of the operating element 120 are driven via the spur gears 112 and 114 of the transmission 104. The operating element 120 lies with an end face on a contact shoulder 142 of the housing body 122. As a result, the operating element 120, on operation of the brake booster 100, can move the housing body 122 to the left along the longitudinal axis L in FIG. 1. In the case of driver-induced operation of the brake booster 100, the housing body 122 with the contact surface 138 and the end face of the end element 140 of the operating member 124 act on the rubber-elastic reaction disk 134. The resulting force from the sum of the operating force generated by the driver (where present) and the boosting force (or operating force in the case of autonomous or semi-autonomous braking) generated by the electric motor 102 and the transmission 106 is transmitted by the reaction disk 134 and the force application element 136 lying thereon to the pressure piston 202. A spring 144 arranged between the housing 130 of the brake booster 100 and the housing body 122 is thereby compressed, and the pressure piston 202 of the master brake cylinder 200 is moved to the left in the direction of the longitudinal axis L, whereby the second pressure piston 204 also moves to the left. In this manner, a hydraulic brake pressure is generated in the pressure chambers 208 and 210. The brake pressure generated in the pressure chambers 208 and 210 is transmitted via the brake circuits 302 and 304 to the wheel brakes 400 in order to carry out a braking operation.

After a braking operation, the operating unit 106 in FIG. 1 is moved by the restoring force of the spring 144 and the hydraulic pressure in the pressure chambers 208, 210 back to the right again along the longitudinal axis L in FIG. 1.

Figure 2:
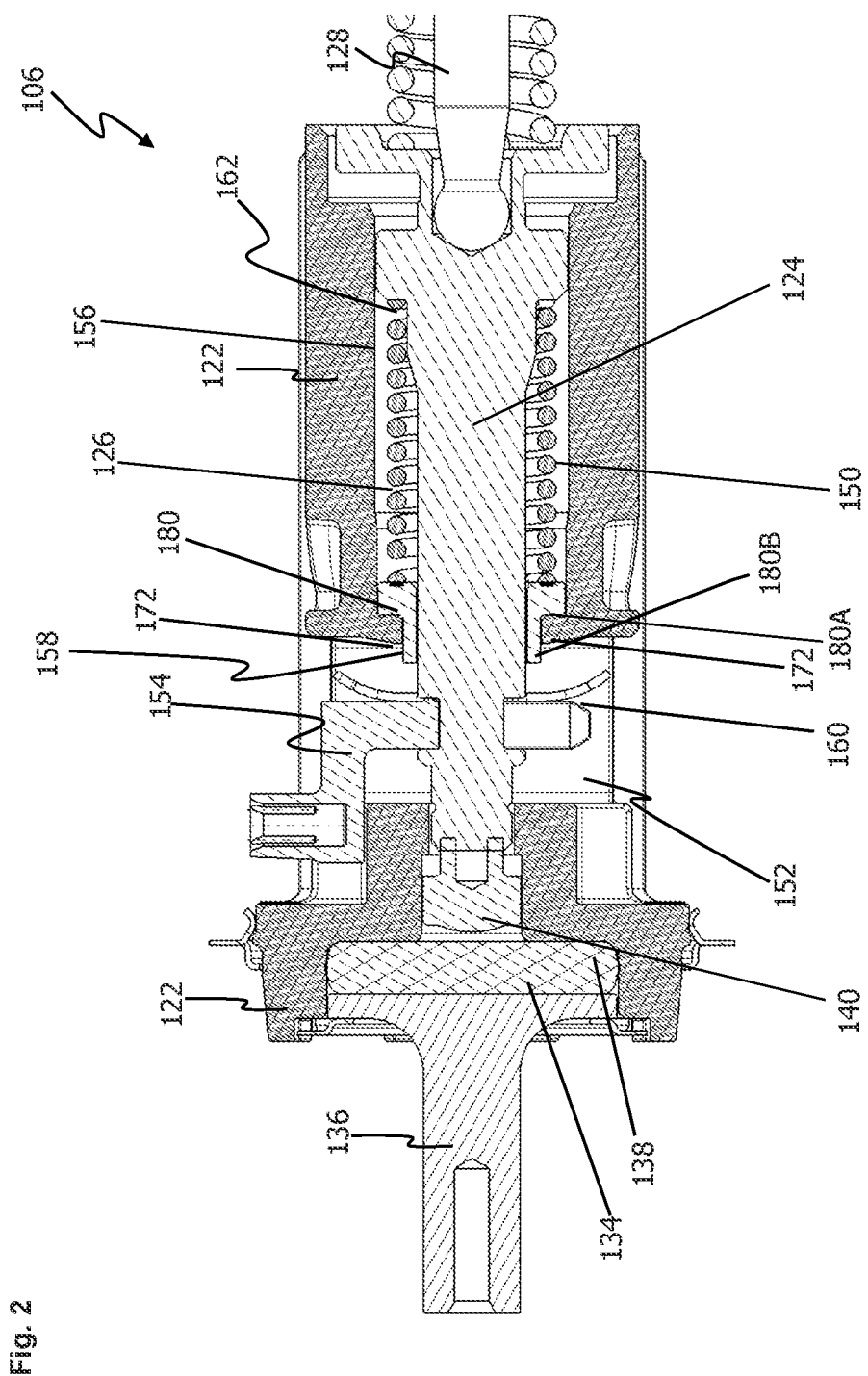
FIG. 2 shows, schematically, a cutaway side view of an embodiment of an electrically actuatable operating unit according to the present disclosure having a sleeve element according to one embodiment.

FIG. 2 shows an operating unit 106 according to the present disclosure in an enlarged view. Elements of the operating unit 106 of FIG. 2 which correspond to elements of the operating unit 106 of FIG. 1 are thereby provided with the same reference numerals. The operating unit 106 of FIG. 2 can, as is shown in FIG. 1 with respect to the operating unit 106 depicted therein, have the same arrangement and function.

In FIG. 2, the recess of the housing body 122 in which the operating member 124 is partially received is identified by reference numeral 150. The recess 150 is here in the form of a cylindrical recess but may also have any other conceivable shape, for example be in the form of a parallelepiped. The recess 150 is delimited circumferentially (or along the long side) by an inside wall 156 (or a plurality of inside walls in the case of a parallelepiped). At one longitudinal end, in FIG. 2 at the left longitudinal end, the recess 150 is delimited by a contact shoulder 172 on which the spring 126 is supported with its left end in terms of FIG. 2. The spring 126 is here supported indirectly on the contact shoulder 172, as will be explained in greater detail hereinbelow. In the housing body 122 there is provided a through-opening 158 which is delimited circumferentially by the contact shoulder 172. The operating member 124 is arranged so as to project in a displaceable manner through the through-opening 158.

It will additionally be seen in the longitudinal section of FIG. 2 that the housing body 122 is in the form of a hollow body. A hollow region 152 forms a further recess. The hollow region 152 is separated from the recess 150 by the contact shoulder 172. The through-opening 158 thus connects the hollow region 152 to the recess 150. In the hollow region 152 there is received a stop element 154 which extends transversely to the operating direction of the operating member 124 and which is rigidly coupled at a first end with the operating member 124. At a second, opposite end, the stop element 154 projects outwards through a window formed in the housing body 122 in order to be coupled mechanically with a corresponding element of a displacement sensor that is arranged there. As a result, it is possible to quantitatively determine the movement of the operating member 124 by means of the displacement sensor.

The first end of the stop element 154 can be coupled with the operating member 124 in any possible manner. The stop element 154 can, for example, engage into correspondingly shaped openings in the operating member 124, the stop element 154 can be guided through a through-opening of the actuating member 124, or the stop element 154 can, for example, be formed at the first end in such a manner that it circumferentially surrounds the operating member 124. The stop element 154 here has a fork-shaped attachment portion which allows the stop element 154 to be attached to the operating member 124 transversely to its longitudinal axis, wherein the opposing forks engage into a circumferential, groove-like indentation in the operating member 124. In the example shown here, the stop element 154 in the cutaway view has the shape of a "double L", but it can also have any other suitable shape.

In the region of the stop element 154, a leaf spring 160 is fastened radially on the outside to the operating member 124. As can be seen in FIG. 2, the leaf spring 160 lies centrally on the stop element 154. The surface of the stop shoulder 172 that faces the leaf spring and the surface of the leaf spring 160 that faces the stop shoulder 172 each form coupling surfaces via which the housing body 122 can be mechanically coupled with the operating member 124. Such a coupling can take place, for example, during a movement of the housing body 122 in the braking direction in the case of autonomous operation of the brake booster 100.

As described with respect to FIG. 1, a torque generated by the electric motor 102 is transmitted via the transmission 104 to the operating element 120 of the operating unit 106 and, from there, via the contact shoulder 142, to the housing body 122. In the case of autonomous or semi-autonomous operation of the brake booster 100, which then functions as a (single) operating force generator, the operating member 124, as a result of the coupling of the housing body 122 with the operating member 124 (via the stop element 154 connected to the operating member 124 and the leaf spring 160 arranged between the housing body 122 and the stop element 154), is moved concomitantly in the braking direction independently of an operation of the brake pedal by the driver. Since the operating member 124 is coupled via the force input member 128 with the brake pedal, the brake pedal is also moved concomitantly in the direction towards the vehicle floor.

If there is an obstruction (e.g. a foot) in the adjustment path of the brake pedal, that is to say between the brake pedal and the vehicle floor, a retaining force (drag force) contrary to the braking direction acts on the brake pedal and the connecting components between the brake pedal and the components of the operating unit 106 that are moved by the electric motor 102. In particular, a retaining force acting in the pulling direction (contrary to the braking direction) acts on the operating member 124 and the force input member 128, which can result in damage to components of the operating unit 106 and the obstruction (e.g. a foot injury).

The leaf spring 160 acts as a resilient damping element and is resiliently deformed under the action of such a retaining force contrary to the braking direction. The resilient deformation causes a (at least initial) reduction of the retaining force acting on the components and of the forces which, when an obstruction is trapped, act on the trapped obstruction.

The degree of deformation of the resilient intermediate element, here of the leaf spring 160, can serve as a measure for detecting a trapped obstruction. The degree of deformation of the resilient intermediate element 160 is thus directly related to a difference between a movement of the operating member 124 that is detected (for example by means of the displacement sensor) and a movement of the motor drive and thus of the housing body 122 that is detected (for example by means of a motor position sensor). However, the resilient intermediate element 160 can also be deformed as a result of other forces which are attributable, for example, to the spring 126. These "additional" deformations of the intermediate element 160 mask the deformations caused by the "trapping", which can lead to uncertainties and inaccuracies in the detection of a trapped obstruction. Furthermore, these "additional deformations", owing to the limited deformability of the resilient intermediate element 160, in some circumstances reduce the deformation path which is provided for reducing the retaining/pulling force.

When determining the difference between a movement of the operating member 124 that is detected (for example by means of the displacement sensor) and a movement of the motor drive and thus of the housing body 122 that is detected (for example by means of a motor position sensor), it is generally additionally necessary to know the dead travel (or lag) between the housing body 122 and the operating member 124. This is the distance which the housing body 122 moves before the leaf spring 160 contacts the contact shoulder 172 and thus the operating member 124 and thus also the pedal are moved concomitantly. This dead travel must be taken into account when determining the movement difference and is normally known. However, during operation it can happen that the determined dead travel differs from the actual dead travel owing to a bending of the leaf spring 160. This effect can also lead to uncertainties and inaccuracies in the detection of a trapped obstruction. These problems are addressed in the exemplary embodiment of FIG. 2 as follows.

According to the present disclosure, the operating unit 106 has a sleeve element 180. The sleeve element 180 is arranged partially inside the recess 150 and projects into the through-opening 158. The sleeve element 180 thus has a first portion 180A which is arranged inside the recess 150 and a second portion 180B which projects into the through-opening 158. In the exemplary embodiment shown here, the second portion 180B projects through the through-opening 158 into the further recess 152.

The sleeve element 180 has a shape which is adapted to the shape of the recess 150 and/or of the operating member 124 and/or of the through-opening. The sleeve element 180 circumferentially surrounds a portion of the operating member 124 completely or at least in some regions. That is to say, the sleeve element 180 can have hollow regions in the circumferential direction. According to the disclosure, the first portion 180A, for example, can surround the operating member 124 completely and the second portion 180B can surround the operating member 124 only partially, or vice versa. Or the sleeve element 180 is configured in such a manner that both the first portion 180A and the second portion 180B surround the operating member 124 completely or only partially.

In the example here, the sleeve element 180 is annular. It has a central opening through which the operating member 124 is guided. The first portion 180A has a larger outside diameter than the second portion 180B. As a result, the first portion 180A defines a contact surface which cooperates with the contact shoulder 172. The sleeve element 180, more precisely the first portion 180A of the sleeve element 180, is thus arranged between one longitudinal end of the helical spring 126 and the contact shoulder 172. The helical spring 126 holds the sleeve element 180 in contact with the contact shoulder 172. With its second longitudinal end, the helical spring 126 is supported on a collar 162 of the operating member 126.

The second portion 180B has a smaller outside diameter than the first portion 180A, so that it can project into the through-opening 158 or can project through the through-opening 158. The second portion 180B is thus arranged between the operating member 124 and an inner circumferential surface of the contact shoulder 172 that delimits the through-opening 158. The end of the sleeve element 180 that is arranged outside the through-opening 158 in the further recess 152 forms a stop for the leaf spring 160 when the leaf spring is bent as a result of pulling forces (drag forces) in the case where an obstruction is trapped. This will be discussed in greater detail hereinbelow.

The sleeve element 180 and the operating member 124 are configured and arranged relative to one another in such a manner that the operating member 124 is movable (optionally guided), more precisely displaceable, relative to the sleeve element 180 and by means of the sleeve element. This can be achieved in that the operating member 124 and the sleeve element 180 are arranged at a small distance from one another. However, this can also be achieved in that the sleeve element 180 lies on the operating member 124, so that a guided movement with low friction is made possible.

With regard to the housing body 122, the sleeve element 180 can lie on the housing body 122. An arrangement in which the sleeve element 180 lies on the housing body 122 effects a (more or less great) localization of the sleeve element 180 with respect to the housing body 122. As a result, it is possible for the spring 126 to be so fixedly "enclosed" in the recess 150 by the sleeve element 180 that large vibrations of the spring 126 are not permitted.

Ideally, the sleeve element 180 thus has the effect both that the spring 126 is arranged so fixedly in the recess 126 that there are no or no undesirable vibrations of the sleeve element 180 which lead to bending of the resilient element 160, and, if undesirable vibrations do occur, that they are not transmitted or at least are transmitted in an attenuated manner to the housing body 122. This can be achieved by deformation of the sleeve element 180 and/or displacement of the sleeve element 180 and/or acting frictional forces.

Furthermore, in the event of bending of the leaf spring and the action of a drag force on the operating member 124, the bending of the leaf spring 160 is limited by the free end of the sleeve element 180, which acts as a stop. Concretely, the leaf spring 160 then comes to lie with its middle on the free end of the sleeve element. This state also has the effect that vibrations of the system are prevented or reduced so that, for example, the spring 126 is also unable to vibrate or at least is able to vibrate to a reduced extent relative to the housing body 122.

The sleeve element 180 can be formed from a metallic material. The sleeve element 180 can also be formed from a. The sleeve element 180 can constitute an enclosure element for the spring 126 and/or a damping element for vibrations of the spring 126 and of the system as a whole.

The operating unit 106 can have, in addition to the sleeve element 180, a separately formed damping element which damps undesirably occurring system vibrations, in particular in the case of autonomous or semi-autonomous braking. This can be an O-ring, for example, which is arranged between the operating member 124 and the housing body 122. In the exemplary embodiment of FIG. 2, the O-ring or the damping element can thus very generally be arranged in a circumferential groove of the sleeve element 180 which is formed in the first portion 180A between the housing body 122 and the operating member 124. Furthermore, the damping element can be in the form of, for example, a friction sleeve which is arranged between the sleeve element 180 and the operating member 126 and/or between the sleeve element 180 and/or the housing body 124. The frictional forces acting between the elements 180, 124 or 180, 122 can then reduce undesirably occurring vibrations of the system. The friction of the two elements 180, 124 or 180, 122 in this contact region can be used for damping purposes. The friction sleeve is then fixedly connected to the sleeve element 180.

The solution disclosed herein is suitable in particular for electrically controlled operating units which provide direct mechanical coupling of the brake pedal with an electromechanically driven component of the particular operating unit, in which the brake pedal can thus be moved concomitantly in the case of autonomous or semi-autonomous braking. In the solutions known from the prior art, the vibrations that occur when there is a trapped obstruction during autonomous braking make the detection of the trapped obstruction as such more difficult. With the disclosed damping element, such vibrations can for the most part be prevented or at least reduced and a trapped obstruction can thus reliably be detected. When a trapped obstruction is detected, the further brake pressure build-up can then be switched to another unit, for example the hydraulic pump of an electronic stability control (ESC) system, and the electric motor 102 can cause a movement of the operating unit 106 contrary to the braking direction in order to reduce the trapping force.

What is claimed is:

1. An electrically actuatable operating unit (106) for a motor vehicle brake (400), having
    a housing body (122) which is arranged so as to be displaceable in a braking direction for operation of the motor vehicle brake (400),
    a recess (150) formed in the housing body (122), wherein the recess (150) is delimited at one longitudinal end by a contact shoulder (172),
    a through-opening (158) delimited by the contact shoulder (172),
    an operating member (124) which is arranged in the recess (150) so as to be displaceable for operation of the motor vehicle brake (400) and projects through the through-opening (158) of the contact shoulder (172), wherein the operating member (124) can be arranged in a force-transmitting manner between a brake pedal and the motor vehicle brake (400),
    a resilient intermediate element (160) which limits a pulling force which acts on the operating member (124) during operation of the motor vehicle brake (400) by electrical actuation of the operating unit (106),
    a return spring (126) which is arranged in the recess (150) and is configured to move the operating member (124) relative to the housing body (122) away from the contact shoulder (172), and having
    a sleeve element (180) which circumferentially surrounds a portion of the operating member (124) at least partially and is held in contact with the contact shoulder (172) by the return spring (126), and wherein the sleeve element (180) projects into the through-opening (158) in such a manner that it is arranged between the operating member (124) and an inner circumferential surface of the contact shoulder (172) that delimits the through-opening (158), and an end of the sleeve element (180) that is arranged outside the recess (150) forms a stop for the resilient intermediate element (160) in order to limit the deformation of the resilient intermediate element (160).

2. The operating unit (106) as claimed in claim 1, wherein the operating member (124) is arranged so as to be displaceable relative to the sleeve element (180).

3. The operating unit (106) as claimed in claim 1, wherein the sleeve element (180) lies or is guided with an inner circumferential surface on an outer circumferential surface of the operating member (124).

4. The operating unit (106) as claimed in claim 1, wherein the sleeve element (180) lies or is guided with an outer circumferential surface on the inner circumferential surface of the contact shoulder (172) that delimits the through-opening (158).

5. The operating unit (106) as claimed in claim 1, wherein the sleeve element (180) lies or is guided with an outer circumferential surface on an inside wall (156) of the housing body (122) that delimits the recess (150).

6. The operating unit (106) as claimed in claim 1, wherein the sleeve element (180) has a first portion (180A) which is arranged in the inside of the recess (150) and a second portion (180B) which projects into the through-opening (158).

7. The operating unit (106) as claimed in claim 6, wherein the first portion (180A) has a larger outside dimension than the second portion (180B).

8. The operating unit (106) as claimed in claim 1, wherein the housing body (122) can be coupled with the operating member (124) by means of a stop element (154) which is connected to the operating member (124).

9. The operating unit (106) as claimed in claim 1, wherein the resilient intermediate element (160) is a leaf spring mounted in the housing body (122).

10. The operating unit (106) as claimed in claim 1, wherein the operating member (124) can be coupled with the housing body (122) by means of the resilient intermediate element (160).

11. An electromechanical brake booster (100) having an electrically actuatable operating unit (106) as claimed in claim 1.

12. A motor vehicle brake system (1000) having the brake booster (100) as claimed in claim 11.

13. An electrically actuatable operating unit (106) for a motor vehicle brake (400), the electrically actuatable operating unit (106) comprising:
- a housing body (122) arranged so as to be displaceable in a braking direction for operation of the motor vehicle brake (400);
- a recess (150) formed in the housing body (122), the recess (150) being delimited at one longitudinal end by a contact shoulder (172);
- a through-opening (158) delimited by the contact shoulder (172);
- an operating member (124) arranged in the recess (150) so as to be displaceable for operation of the motor vehicle brake (400) and projecting through the through-opening (158) of the contact shoulder (172), the operating member (124) being arranged in a force-transmitting manner between a brake pedal and the motor vehicle brake (400);
- a resilient intermediate element (160) limiting a pulling force which acts on the operating member (124) during operation of the motor vehicle brake (400) by electrical actuation of the operating unit (106), the operating member (124) being coupled with the housing body (122) by means of the resilient intermediate element (160);
- a return spring (126) arranged in the recess (150) and configured to move the operating member (124) relative to the housing body (122) away from the contact shoulder (172); and
- a sleeve element (180) at least partially circumferentially surrounding a portion of the operating member (124), the sleeve element (180) being held in contact with the contact shoulder (172) by the return spring (126), the sleeve element (180) projecting into the through-opening (158) in such a manner that the sleeve element (180) is arranged between the operating member (124) and an inner circumferential surface of the contact shoulder (172) that delimits the through-opening (158).

14. An electrically actuatable operating unit (106) for a motor vehicle brake (400), the electrically actuatable operating unit (106) comprising:
- a housing body (122) arranged so as to be displaceable in a braking direction for operation of the motor vehicle brake (400);
- a recess (150) formed in the housing body (122), the recess (150) being delimited at one longitudinal end by a contact shoulder (172);
- a through-opening (158) delimited by the contact shoulder (172);
- an operating member (124) arranged in the recess (150) so as to be displaceable for operation of the motor vehicle brake (400) and projecting through the through-opening (158) of the contact shoulder (172), the operating member (124) being arranged in a force-transmitting manner between a brake pedal and the motor vehicle brake (400);
- a return spring (126) arranged in the recess (150) and configured to move the operating member (124) relative to the housing body (122) away from the contact shoulder (172); and
- a sleeve element (180) at least partially circumferentially surrounding a portion of the operating member (124) and directly contacting the operating member (124), the sleeve element (180) being held in contact with the contact shoulder (172) by the return spring (126), the sleeve element (180) projecting into the through-opening (158) in such a manner that the sleeve element (180) is arranged between the operating member (124) and an inner circumferential surface of the contact shoulder (172) that delimits the through-opening (158).

15. The operating unit (106) as claimed in claim 14, wherein the sleeve element (180) has a first portion (180A) which is arranged in the inside of the recess (150) and a second portion (180B) which projects into the through-opening (158).

16. The operating unit (106) as claimed in claim 15, wherein the first portion (180A) has a larger outside dimension than the second portion (180B), inside diameters of the first and second portions being equal to one another.

* * * * *